United States Patent [19]
Cooper et al.

[11] Patent Number: 6,089,273
[45] Date of Patent: Jul. 18, 2000

[54] ENERGY ATTENUATION APPARATUS FOR A SYSTEM CONVEYING LIQUID UNDER PRESSURE AND METHOD OF ATTENUATING ENERGY IN SUCH A SYSTEM

[75] Inventors: Jack R. Cooper, Dearborn; Yungrwei Chen, West Bloomfield, both of Mich.

[73] Assignee: Dayco Products, Inc., Dayton, Ohio

[21] Appl. No.: 09/397,278

[22] Filed: Sep. 16, 1999

Related U.S. Application Data

[62] Division of application No. 08/846,912, Apr. 30, 1997.

[51] Int. Cl.$^7$ .................................................. F16L 55/04
[52] U.S. Cl. ................................................ 138/30; 138/42
[58] Field of Search ........................ 138/30, 42; 181/222, 181/232, 233, 238, 256, 257, 275, 281

[56] References Cited

U.S. PATENT DOCUMENTS

| | | | |
|---|---|---|---|
| Re. 25,384 | 5/1963 | Bryant | 181/275 |
| 2,777,467 | 1/1957 | Powell et al. | 138/37 |
| 3,164,174 | 1/1965 | Berthod et al. | 138/30 |
| 3,532,125 | 10/1970 | Everett et al. | 138/30 |
| 3,842,940 | 10/1974 | Bonikowski | 181/257 |
| 3,933,172 | 1/1976 | Allen | 138/30 |
| 4,043,539 | 8/1977 | Gilmer et al. | 138/42 |
| 4,064,963 | 12/1977 | Kaan et al. | 181/256 |
| 4,637,435 | 1/1987 | Chirdon | 138/30 |
| 4,700,805 | 10/1987 | Tanaka et al. | 181/256 |
| 4,787,419 | 11/1988 | Megee et al. | 138/42 |
| 5,025,890 | 6/1991 | Hisashige et al. | 181/256 |
| 5,367,131 | 11/1994 | Bemel | 181/232 |

*Primary Examiner*—James Hook
*Attorney, Agent, or Firm*—Joseph V. Tassone

[57] ABSTRACT

An energy attenuation apparatus for a system conveying liquid under pressure, and a method for attenuating energy in such a system, are provided. The apparatus includes a housing containing at least one chamber, wherein an inlet conduit extends into the at least one chamber, a portion thereof being disposed in the housing and having at least one aperture for introducing liquid therefrom into the at least one chamber of the housing, and wherein an outlet conduit extends out of the at least one chamber, with a portion thereof being disposed in the housing and having at least one aperture for receiving liquid from the at least one chamber of the housing.

14 Claims, 6 Drawing Sheets

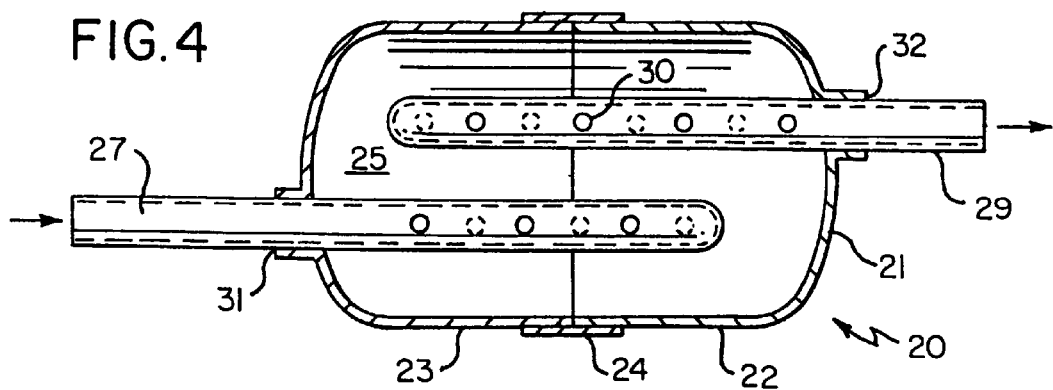
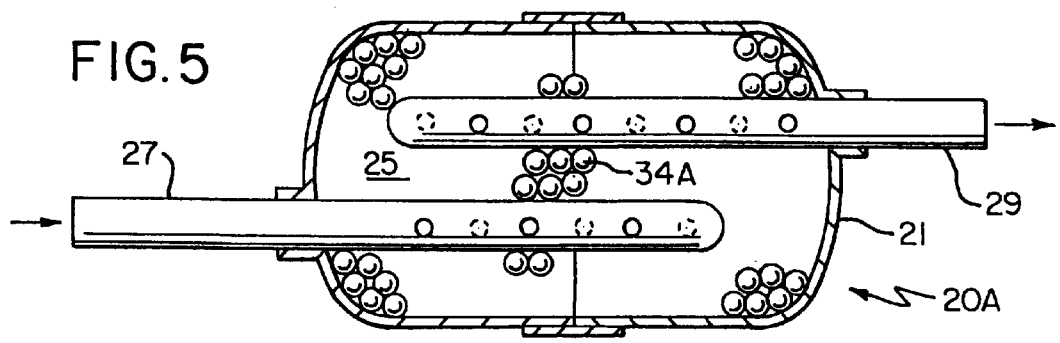
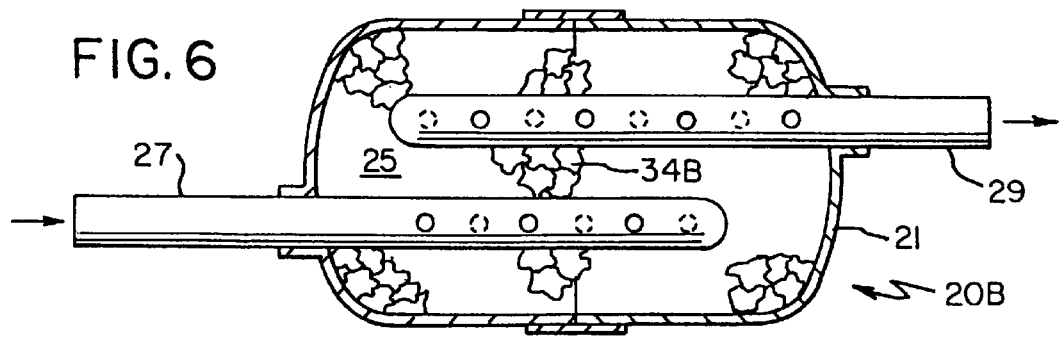
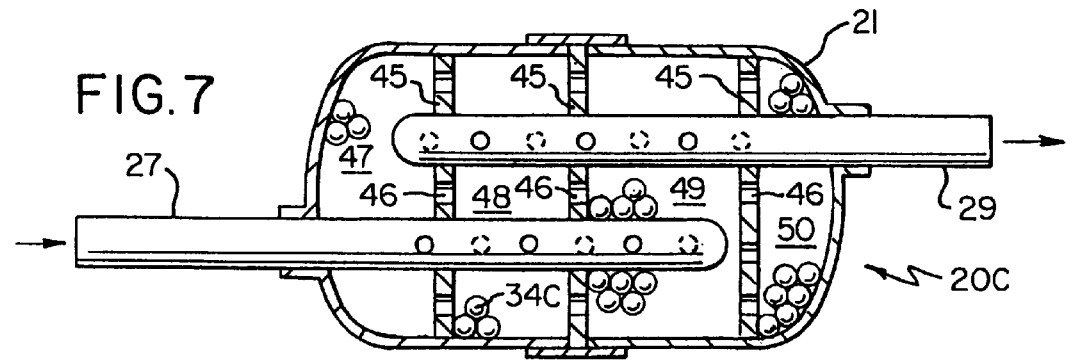

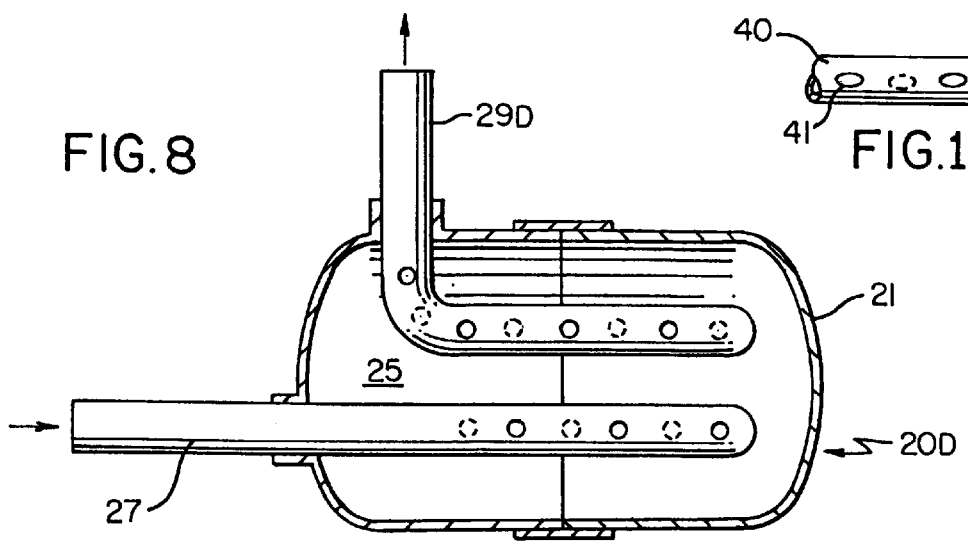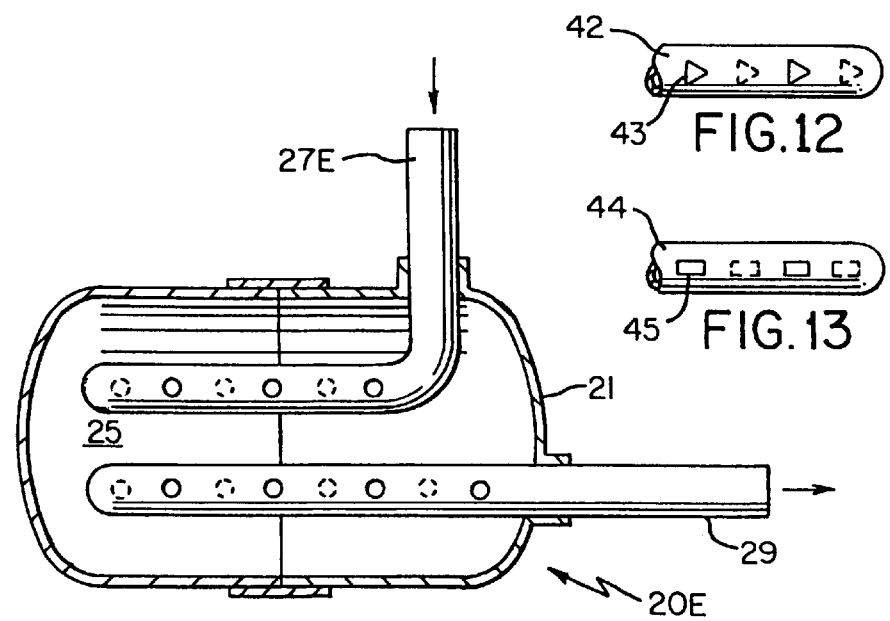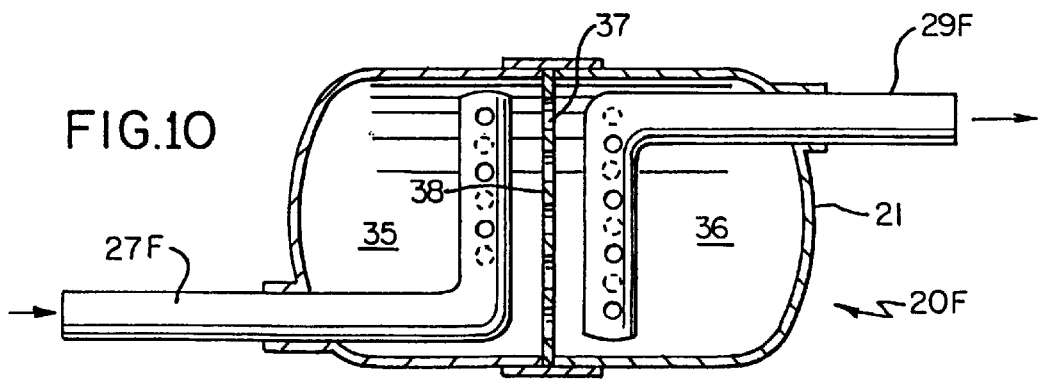

ENERGY ATTENUATION APPARATUS FOR A SYSTEM CONVEYING LIQUID UNDER PRESSURE AND METHOD OF ATTENUATING ENERGY IN SUCH A SYSTEM

CROSS REFERENCE TO RELATED APPLICATION

This application is a divisional patent application of its copending parent patent application Ser. No. 08/846,912 filed Apr. 30, 1997.

BACKGROUND OF THE INVENTION

1. Field of the Invention

This invention relates to a new energy attenuation apparatus for a system conveying liquid under pressure and to a method of attenuating energy in such a system. The invention is particularly suitable for placement in a system conveying liquid under pressure for the attenuation of pressure pulsations in the liquid, especially in the hydraulic system of the power steering unit of a vehicle. The invention would also be suitable for other hydraulic fluids.

2. Prior Art Statement

In hydraulic systems where the operating liquid is circulated by a pump, the pulsations of pressure that are generated by the pump are transmitted through the conduits and result in noise and/or vibration being produced by the hydraulic liquid. In the case of power steering fluid in vehicles, such noise and/or vibration is caused, for example, when vehicles are being parked or unparked at idle or very low speeds of movement thereof, such as by barely moving into and out of a parking space or the like while the wheels of the vehicle are being turned by the power steering mechanism thereof. In particular, substantial noise and/or vibration (shutter) can be produced in such a situation when the power steering fluid passes through the power steering mechanism from the fluid pump to the effective steering structure. Further background in this area can be obtained from U.S. Pat. No. 3,323,305, Klees, whereby this U.S. Pat. is being incorporated into this disclosure by this reference thereto.

Devices are known for suppressing noise in exhaust gas mufflers. For example, U.S. Pat. No. 4,501,341, Jones, provides two side branch resonators, while U.S. Pat. No. 4,371,053, Jones, provides for an apertured tube in a muffler housing. Systems are also known for controlling the resonation of pressure waves in fuel injection systems. For example, U.S. Pat. No. 5,168,855, Stone, passes fluid through check valves that are provided with a flow restriction either directly therein or in a bypass line. U.S. Pat. No. 509,391, DeGroot, provides a spool valve assembly for controlling flow between inlet and outlet ports.

Applicants are not aware of any teaching of transferring flow of liquid under pressure from one apertured conduit to another as a means of suppressing energy.

SUMMARY OF THE INVENTION

It is therefore an object of the present invention to provide an improved apparatus and method for attenuating energy in a system that conveys liquid under pressure.

This object is realized pursuant to the energy attenuation apparatus of the present invention by providing housing means containing at least one chamber, an inlet conduit extending into said at least one chamber, wherein in a portion thereof disposed in said housing means said inlet conduit has at least one aperture for introducing liquid therefrom into said at least one chamber of said housing means, and an outlet conduit extending out of said at least a one chamber wherein in a portion thereof disposed in said housing means said outlet conduit has at least one aperture for receiving liquid from said at least one chamber of said housing means.

Accordingly, it is an object of this invention to provide a novel energy attenuation apparatus having one or more of the novel features of this invention as set forth above or hereinafter shown or described.

Another object of this invention is to provide a new method of attenuating energy in a system conveying liquid under pressure, the method of this invention having one or more of the novel features of this invention as set forth above or hereinafter shown or described.

Other objects, uses and advantages of this invention are apparent from a reading of the specification in conjunction with the accompanying schematic drawings, which form a part thereof and wherein:

BRIEF DESCRIPTION OF THE DRAWINGS

FIG. 4 is a cross-sectional view of one exemplary embodiment of the energy attenuation apparatus of this invention;

FIG. 5 is a view similar to that of FIG. 4 of a second exemplary embodiment of the energy attenuation apparatus of this invention;

FIG. 6 is a view similar to that of FIG. 4 of a third exemplary embodiment of an energy attenuation apparatus of this invention;

FIG. 7 is a view similar to that of FIG. 4 of a further exemplary embodiment of an energy attenuation apparatus of this invention;

FIG. 8 is a view similar to that of FIG. 4 of yet another exemplary embodiment of an energy attenuation apparatus of this invention;

FIG. 9 is a view similar to that of FIG. 4 of a further exemplary embodiment of an energy attenuation apparatus of this invention;

FIG. 10 is a view similar to that of FIG. 4 of another exemplary embodiment of an energy attenuation apparatus of this invention;

FIGS. 11–13 show portions of inlet and/or outlet conduits that are provided with alternative configurations of apertures;

DESCRIPTION OF PREFERRED EMBODIMENTS

Figure 1:
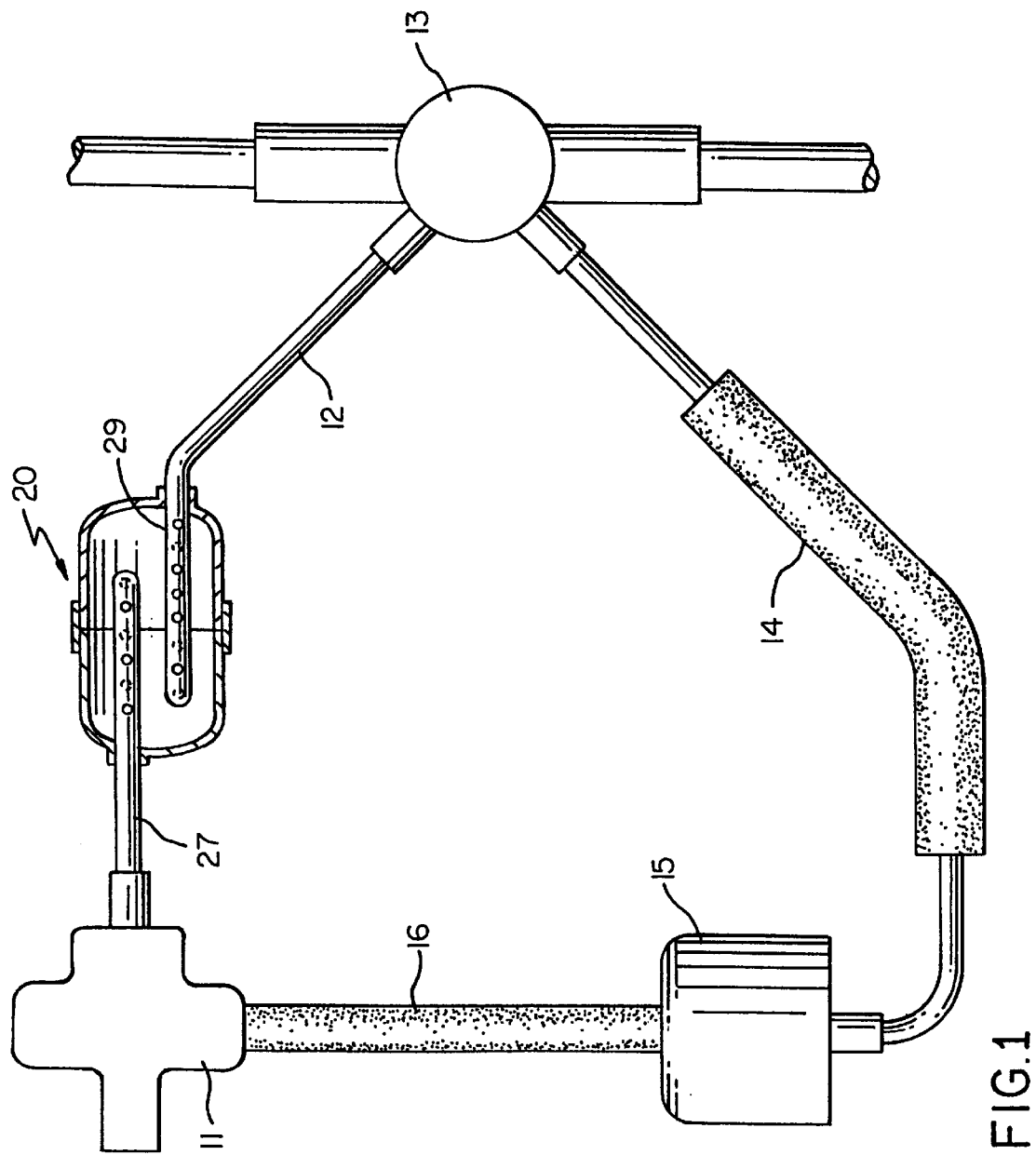
FIG. 1 illustrates a simplified automotive power steering system that incorporates one exemplary embodiment of the energy attenuation apparatus of this invention.
Figure 2:
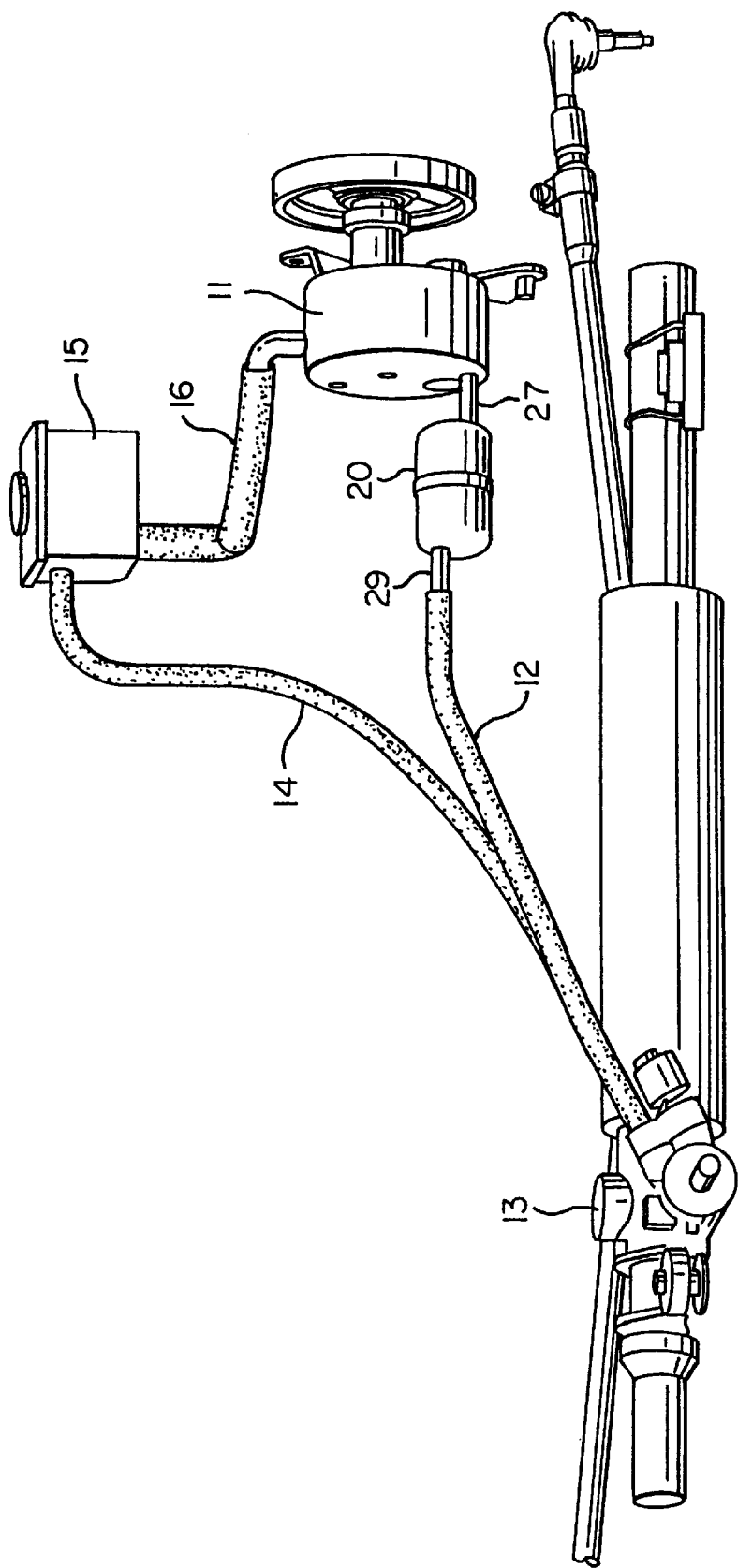
FIG. 2 shows a power steering system utilizing the inventive energy attenuation apparatus.

While the various features of this invention are hereinafter illustrated and described as providing an energy or sound attenuation apparatus for an automotive power steering system, it is to be understood that the various features of this invention can be utilized singly or in various combinations thereof to provide an energy attenuation apparatus for other systems that convey liquid under pressure.

Therefore, this invention is not to be limited to only the embodiments illustrated in the drawings, because the drawings are merely utilized to illustrate one of the wide variety of uses of this invention.

Referring now to the drawings in detail, FIG. 1 illustrates a simplified automotive power steering system. During operation, the power steering pump 11 generates pressure ripples that are transmitted through tubing, such as steel tubing, to the pressure line 12, the power steering gear 13, the return line 14, and the reservoir 15, and finally flow back to the pump 11 itself by means of the supply line 16. It should be noted that rather than being separated by a hose or similar conduit, the reservoir 15 and the pump 11 could actually be a single unit.

In order to greatly reduce such pressure ripples before they reach the gear 13 via the pressure line 12, and thereby eliminate or at least greatly reduce the power steering noise or vibration generated by the power steering pump 11, the energy attenuation apparatus of this invention, which is generally indicated by the reference numeral 20, is illustrated as being disposed in the pressure line 12 between the pump 11 and the gear 13. Various exemplary embodiments of the energy attenuation apparatus 20 and components and arrangements thereof are illustrated in FIGS. 2–15, and will be described in detail subsequently.

The energy attenuation apparatus 20 that is shown disposed in the pressure line 12 in FIG. 1 is shown in greater detail in FIG. 4. In particular, the energy attenuation apparatus 20 comprises a canister or housing 21 that in the illustrated embodiment is a two-part housing made up of the parts 22 and 23 that are interconnected by the ring 24. In this embodiment of the energy attenuation apparatus, a single chamber 25 is formed in the housing 21. It is to be understood that the size and shape of the housing 21 can vary with the space available to accommodate same as well as with the existing requirements.

As shown by the arrow, liquid enters the housing 21, for example from the pressure side of the pump 11, by means of an inlet conduit 27, such as a tube or pipe. As can be seen from FIG. 4, this inlet conduit 27 extends well into the chamber 25 of the housing 21. In addition, the inlet conduit 27 is provided with a plurality of apertures or holes 28 that allow the liquid to enter the chamber 25 from the conduit 27.

From the chamber 25, which is also known as a mixing area or a flow control chamber, the liquid enters an outlet conduit 29 by means of a plurality of apertures or holes 30 formed therein. The inlet and outlet conduits 27 and 29 are sealingly disposed in the housing 21 in any convenient manner, as indicated schematically at the locations 31 and 32 respectively. As shown in FIG. 1 and the schematic view of FIG. 2 of a proposed power steering system utilizing the inventive energy attenuation apparatus, the outlet conduit 29 is connected to the pressure line 12 so that the liquid, in this case power steering fluid, can be conveyed to the gear 13.

Although the embodiment illustrated in FIG. 4 provides for a single, hollow chamber into which a straight inlet conduit extends and from which a straight outlet conduit emerges, it has also been found according to the teachings of this invention that other configurations are possible. For example, reference is now made to FIGS. 5–10, wherein other housing and conduit configurations of this invention are shown and are generally indicated by the reference numerals 20A–20F, wherein parts thereof similar to the energy attenuation apparatus 20 of FIG. 4 are indicated by like reference numerals that where appropriate are followed by the reference letter A, B, C, D, E, or F.

The embodiments illustrated in FIGS. 5 and 6 differ from that shown in FIG. 4 only in that the chamber 25 is partially filled with a flow control or filler means. For example, the energy attenuation apparatus 20A of FIG. 5 shows a housing 21 having a chamber 25 that is partially filled with spherical filler means 34A. These filler means 34A can be solid or hollow beads or balls made of steel, rubber, plastic, or any other suitable material, and help to increase the dissipation of energy. The filler means 34A, as well as the filler means to be discussed subsequently, should be made of a non-corrosive material and should be able to withstand temperatures up to 300° F.

FIG. 6 illustrates an embodiment of an energy attenuation apparatus 20B wherein the housing 21 has a chamber 25 that is partially filled with irregularly shaped flow control or filler means 34B. As was the case with the filler means 34A of FIG. 5, the filler means 34B can be made of any suitable material, again solid or hollow, and could even comprise gravel.

The energy attenuation apparatus 20C illustrated in FIG. 7 shows a housing 21 having chamber means that is not only partially filled with filler means 34C, such as steel balls, but is also subdivided into a plurality of chambers by baffle plates, as will be discussed in greater detail subsequently.

FIGS. 8–10 illustrate how either one or both of the inlet and outlet conduits can be bent, rather than having the straight configuration of the previous embodiments. For example, the outlet conduit 29D of the energy attenuation apparatus 20D is bent at right angles prior to exiting the housing 21. Similarly, the inlet conduit 27E of the energy attenuation apparatus 20E of FIG. 9 is bent at right angles after having entered the chamber 25 of the housing 21. It should be noted that the chambers 25 of the energy attenuation apparatus 20D and 20E could also be provided with a flow control or filler means.

In the energy attenuation apparatus 20F illustrated in FIG. 10, both the inlet conduit 27F and the outlet conduit 29F are bent at right angles within the housing 21 although they could also extend linearly as in some of the previously described embodiments. The attenuation apparatus 20F also differs from the previously illustrated embodiments of FIGS. 4–6, 8 and 9 in that the housing 21 does not contain a single chamber, but rather is divided into two chambers 35 and 36. This division of the housing 21 into two chambers is effected by a further flow control means in the form of a baffle 37, which in the illustrated embodiment is disposed in the center of the housing 21. The baffle plate 37 is provided with a plurality of holes 38 in order to allow liquid to flow from the chamber 35 to the chamber 36. Again, one or both of the chambers 35, 36 can be partially filled with filler means. In addition, multiple baffle plates could be provided, either adjacent one another or further subdividing the housing 21 into additional chambers, whereby the conduits 27F, 29F could even extend through some of the baffles. For example, FIG. 7 illustrates a housing 21 that is provided with three such baffles 45, each of which is provided with a plurality of holes 46 in order to allow liquid to flow from the inlet conduit 27 to the outlet conduit 29 through the various chambers 47–50 into which the housing 21 is subdivided by the baffle plates 45. In the illustrated embodiment, the inlet and outlet conduits 27, 29 are illustrated as extending far into the housing 21, thus extending through two or even all three of the baffle plates 45. It will be understood that the inlet and outlet conduits 27, 29 need not extend so far into the housing 21, and could, if desired, respectively extend through only a single one of the baffles 45.

Although the inlet and outlet conduits 27, 29 illustrated in the previously described embodiments have all been provided with spherical holes 28, 30, it is to be understood that any other desired shape could also be used. By way of example only, FIGS. 11–13 show some other shapes for the holes in the inlet and outlet conduits. For example, the inlet and/or outlet conduit 40 illustrated in FIG. 7 is provided with oval apertures 41. The inlet and/or outlet conduit 42 of FIG. 12 is provided with triangular apertures 43. And the inlet and/or outlet conduit 44 of FIG. 13 is provided with rectangular apertures 45.

It should also be noted that although in the illustrated embodiments the inlet and outlet conduits are shown as having closed ends within the chamber or chambers of the housing 21, the ends of the inlet and/or outlet conduits can also be opened, or could also be provided with holes.

Although in the presently preferred embodiments the inlet conduit 27 is illustrated as being provided with six holes, while the outlet conduit 29 is shown as being provided with eight holes 30, the number of holes as well as the dimensions and shapes thereof could vary, although it is presently provided that the inlet conduit 27 have a lesser number of holes or apertures than does the outlet conduit 29. The reverse arrangement would be theoretically possible, whereby the important feature is that the number of holes of the inlet and outlet conduits differ from one another. The number of holes, and the other parameters thereof, will vary as a function, for example, of the size of the pump as well as of the operating conditions. In addition, the holes can be provided on only one side of a given conduit, or on both sides thereof. In addition, although in the illustrated embodiments the holes are showing as being aligned with one another in a longitudinal direction of the conduit, such holes could also be provided in a staggered or otherwise random configuration. It is expedient to have the holes of the inlet conduit angularly offset from those of the outlet conduit so that there is no direct flow between the conduits. If each conduit has only one row of holes, these rows could be offset by 1800 relative to one another. If each conduit has two rows of holes, preferably disposed 90° apart, the rows of one of the conduits would be disposed so as to be 90° from the closest row of the other conduit.

Although the baffle 37 of the embodiment of the energy attenuation apparatus 20F shown in FIG. 10 is illustrated as extending in a transverse direction, a similar baffle plate could also be provided in the embodiments of FIGS. 4–6, 8 and 9, wherein such baffle plate would then be disposed in a longitudinal direction of the housing 21 between the inlet and the outlet conduits.

It should also be noted that the inlet and outlet conduits need not necessarily have the same length within the housing 21. In addition, the diameters thereof need not be the same. In addition, the diameter or even the shape of the holes of the inlet and outlet conduits can differ from one another.

Figure 3:
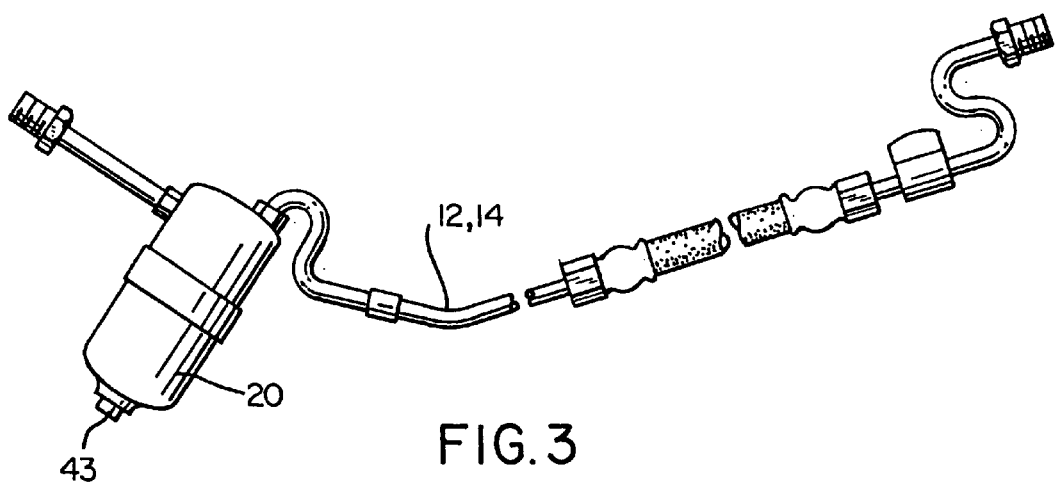
FIG. 3 illustrates one exemplary embodiment of the inventive energy attenuation apparatus in a specific pressure line or return line of an automotive power steering system.
Figure 14:
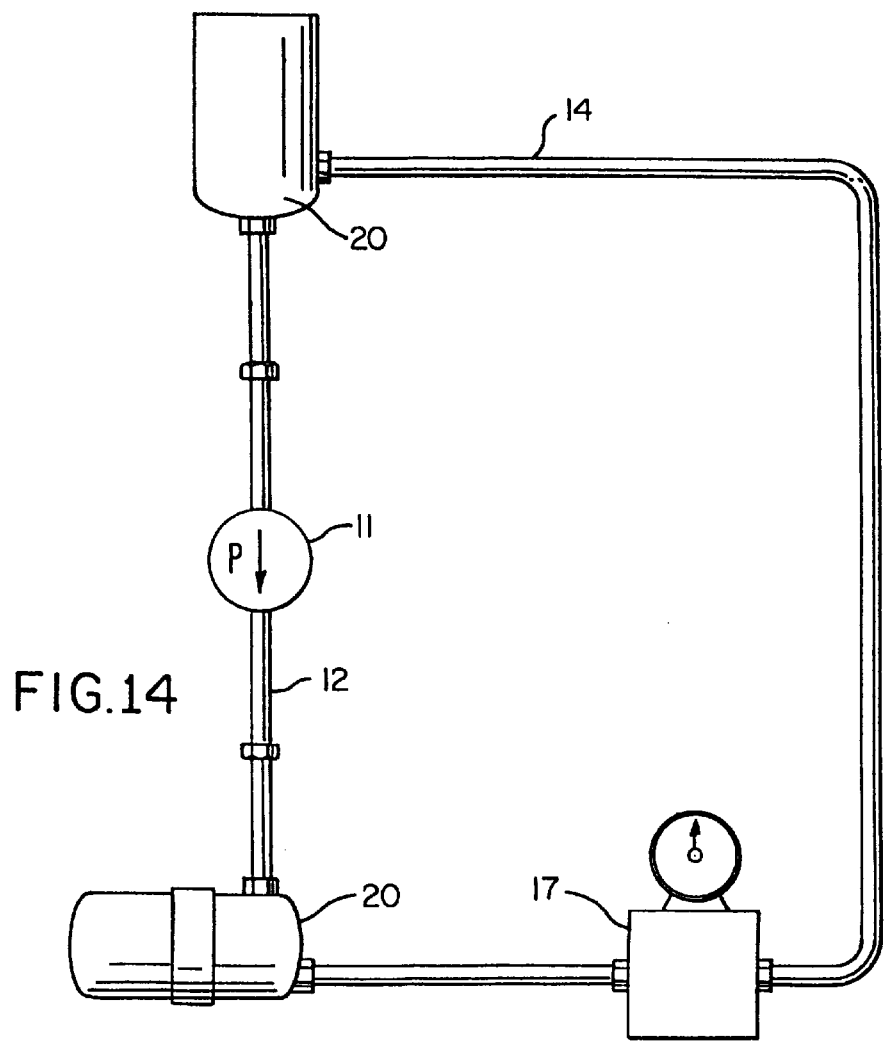
FIG. 14 illustrates a simplified automotive power steering system in which are disposed two energy attenuation apparatus of this invention.

It should furthermore be noted that although the inventive energy attenuation apparatus 20 has been illustrated in FIG. 1 as being disposed between the pump 11 and the gear 13, it is believed that such an attenuation apparatus could alternatively be disposed between the gear 13 and the reservoir 15 in the return line 14 in order to reduce vibration caused by the power steering gear 13. Furthermore, two attenuation apparatus could be provided. For example, FIG. 14 shows a system having two energy attenuation apparatus 20, one in the pressure line 12 to a control valve 17 (similar to the gear 13 of FIG. 1), and another in the return line 14. FIG. 3 illustrates an exemplary embodiment of an actual pressure or return line (bent to accommodate space requirements) in which is disposed an inventive energy attenuation apparatus 20, which in this embodiment is provided with an optional venting means 43.

In one exemplary embodiment of the energy attenuation apparatus 20 of this invention as illustrated in FIG. 4, the housing 21 and the inlet and outlet conduits 27, 29 were made of stainless steel. The housing 21 had an approximately cylindrical shape, and in a small embodiment thereof had a length of approximately 85 mm, a diameter of approximately 50.1 mm, and a thickness of approximately 1 mm. The stainless steel inlet and outlet conduits 27, 29 had an inner diameter of approximately 9.5 mm (⅜of an inch) and a thickness of approximately 1 mm. The diameter of the holes in the inlet and outlet conduits 27, 29 was approximately 3.89 mm.

Figure 15:
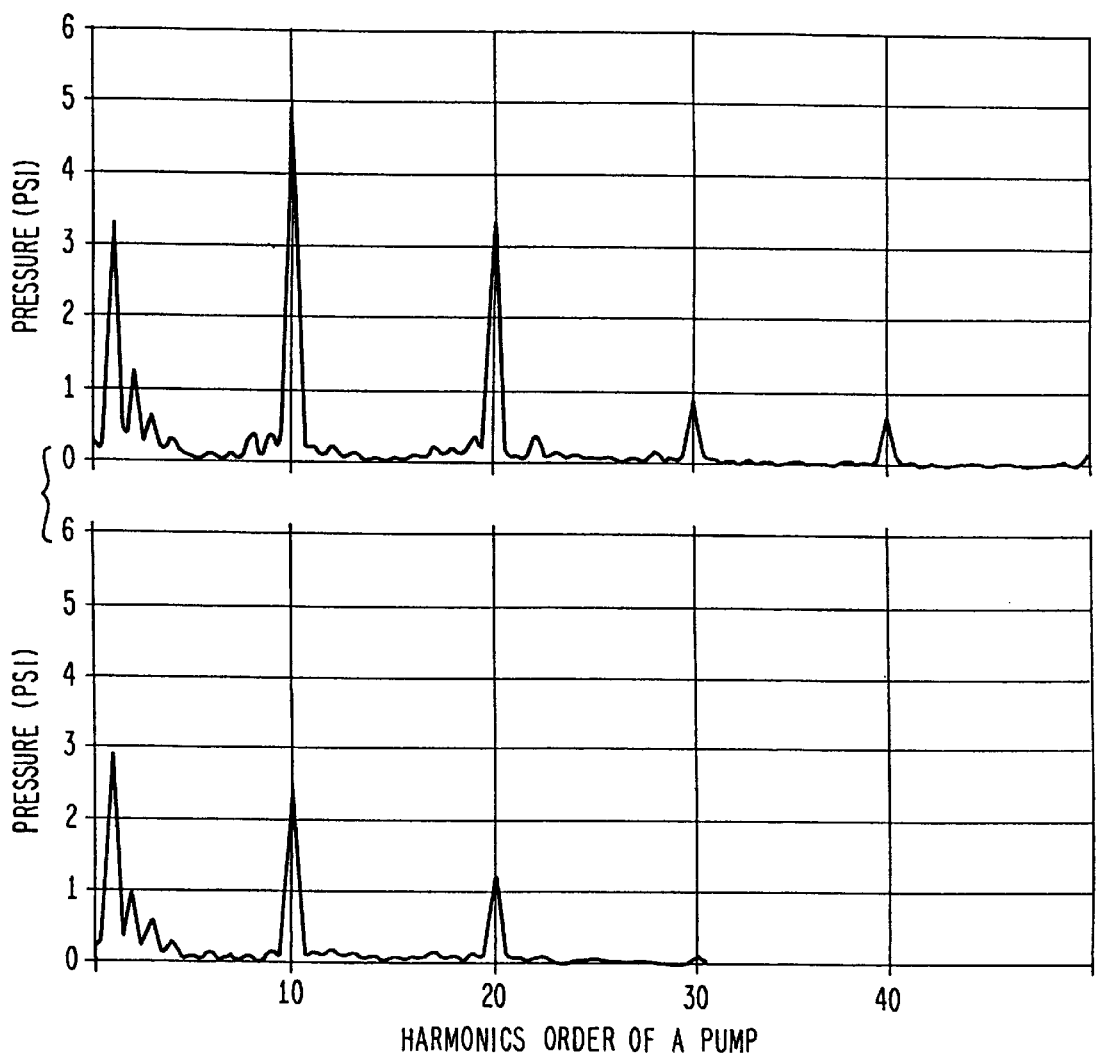
FIG. 15 is a graph showing the improvement in pressure attenuation achieved with the energy attenuation apparatus of this invention.

As indicated previously, the pressure pulses resulting from the revolutions of the pump create harmonics and noise. This phenomenon, along with the significant improvement provided by the inventive energy attenuation apparatus, is shown in FIG. 15, wherein pressure is plotted against the harmonics order of a given pump, with this pump generating ten pulses per revolution thereof. These 10 pulses are considered as the 10th order with the following harmonics being 20th, 30th, etc. This graph, which was plotted for the system of FIG. 1, namely the embodiment of the energy attenuation apparatus 20 of FIG. 4, was effected at a system pressure of 900 psi and a pump speed of 1200 RPM. The pressure at the outlet end of the pump is shown in the upper portion of the graph, whereas the pressure in the pressure line downstream of the energy attenuation apparatus is shown in the lower portion of the graph. The significant improvement accomplished with the inventive energy attenuation apparatus can be clearly seen from this graph. For example, for the tenth order of the pump, a reduction of about 56% is achieved, while for the 20th order, a reduction of about 62% is achieved. Subsequent to the 20th order, the pressure pulses are nearly entirely eliminated.

In view of the foregoing, it can be seen that this invention not only provides a new energy attenuation apparatus, but also this invention provides a new method for attenuating sound or energy in a liquid conveying system.

While the forms and methods of this invention now preferred have been illustrated and described as required by the Patent Statute, it is to be understood that other forms and method steps can be utilized and still fall within the scope of the appended claims, whereby it is believed that each claim sets forth a novel, useful and unobvious invention within the pervue of the Patent Statute.

What is claimed is:

1. An energy attenuation apparatus for a system conveying a liquid under pressure, said apparatus comprising:

housing means containing at least two chambers;

an inlet conduit extending into a first one of said chambers, wherein in a portion thereof disposed in said first chamber of said housing means said inlet conduit has at least one aperture for introducing said liquid under pressure therefrom into said first chamber of said housing means; and an outlet conduit extending out of a second one of said chambers, wherein in a portion thereof disposed in said second chamber of said housing means said outlet conduit has at least one aperture for receiving said liquid, and wherein said inlet conduit and said outlet conduit are at least in part parallel to and offset from one another.

2. An energy attenuation apparatus as set forth in claim 1, wherein at least two baffle plates are provided that divide said housing means into said first chamber, said second chamber, and at least one other chamber.

3. An energy attenuation apparatus as set forth in claim 1, wherein said housing means is provided with an apertured baffle plate that divides said housing means into said first chamber and said second chamber, and wherein said apertured baffle plate provides direct communication between said first and second chambers.

4. An energy attenuation apparatus as set forth in claim 3, wherein at least one of said inlet conduit and said outlet conduit is bent at an angle within its chamber of said housing means.

5. An energy attenuation apparatus as set forth in claim 3, wherein ends of said inlet conduit and said outlet conduit within their chambers of said housing means are closed or open.

6. An energy attenuation apparatus as set forth in claim 1, wherein said inlet conduit is bent at an angle within said first chamber, and said outlet conduit is bent at an angle within said second chamber.

7. An energy attenuation apparatus as set forth in claim 6, wherein both said inlet conduit and said outlet conduit are provided with a plurality of apertures.

8. An energy attenuation apparatus as set forth in claim 6, wherein said apertures are disposed in parallel portions of said inlet and outlet conduits.

9. An energy attenuation apparatus as set forth in claim 6, wherein the parameters of length, size, shape and number and arrangement of apertures, and diameter of said inlet conduit and said outlet conduit can be the same or can differ from one another.

10. An energy attenuation apparatus as set forth in claim 6, wherein said inlet conduit is provided with six apertures, and said outlet conduit is provided with eight apertures.

11. An energy attenuation apparatus as set forth in claim 6, wherein at least one of said chambers is partially filled with a filler means.

12. An energy attenuation apparatus as set forth in claim 11, wherein the material of said filler means is selected from the group consisting of metal, plastic, rubber, and gravel, and the shape of said filler means is selected from the group consisting of spherical and irregularly shaped filler-means.

13. A method of attenuating energy in a system conveying a liquid under pressure, said method including the steps of:
  introducing liquid via an inlet conduit into a housing means having at least two chambers, a portion of said inlet conduit disposed in a first one of said chambers having at least one aperture for introducing said liquid under pressure into said first chamber of said housing means; and
  withdrawing said liquid from said housing means via an outlet conduit that is disposed in a second one of said chambers and has at least one aperture for receiving said liquid, wherein said inlet conduit and said outlet conduit are at least in part parallel to and offset from one another.

14. An energy attenuation apparatus for a system conveying a liquid under pressure, said apparatus comprising:
  housing means containing at least two chambers;
  an inlet conduit extending into a first one of said chambers, wherein in a portion thereof disposed in said first chamber of said housing means said inlet conduit has at least one aperture for introducing said liquid under pressure therefrom into said first chamber of said housing means;
  an outlet conduit extending out of a second one of said chambers, wherein in a portion thereof disposed in said second chamber of said housing means said outlet conduit has at least one aperture for receiving said liquid, and wherein said inlet conduit and said outlet conduit are at least in part parallel to and offset from one another; and
  flow control means disposed in at least one of said chambers.

* * * * *